United States Patent
Aoki

(10) Patent No.: US 7,840,521 B2
(45) Date of Patent: Nov. 23, 2010

(54) COMPUTER-BASED METHOD AND SYSTEM FOR EFFICIENT CATEGORIZING OF DIGITAL DOCUMENTS

(75) Inventor: Kazuo Aoki, Yokohama (JP)

(73) Assignee: International Business Machines Corporation, Armonk, NY (US)

(*) Notice: Subject to any disclaimer, the term of this patent is extended or adjusted under 35 U.S.C. 154(b) by 630 days.

(21) Appl. No.: 11/867,990

(22) Filed: Oct. 5, 2007

(65) Prior Publication Data

US 2009/0094178 A1    Apr. 9, 2009

(51) Int. Cl.
*G06N 5/00* (2006.01)
(52) U.S. Cl. .......................... 706/50; 706/45
(58) Field of Classification Search ............ 706/50, 706/45
See application file for complete search history.

(56) References Cited

FOREIGN PATENT DOCUMENTS

JP    2004046621    12/2004

OTHER PUBLICATIONS

Wang, A Machine Learning System for Understanding Appraisal in Design Documents, Doctoral Thesis, University of Sydney, 2006, pp. 1-53.*

K. Aoki; "Method for Efficient Machine-Learning Classification of Multiple Text Categories"; U.S. Appl. No. 11/867,955, filed Oct. 10, 2007.

* cited by examiner

*Primary Examiner*—Wilbert L Starks, Jr.
(74) *Attorney, Agent, or Firm*—Dillon & Yudell LLP

(57) ABSTRACT

A method, system and computer-readable medium are presented for computer-based supervised classification of digital documents that can exclusively identify an optimal category for the single class model by dividing a calculated score of each category into groups (thresholds can be automatically decided from the knowledge base) and can further predict whether it will be subjected to human examination and whether feedback learning should be performed.

12 Claims, 6 Drawing Sheets

Table 400

| Category | Threshold 1 | Threshold 2 |
|---|---|---|
| Business | 86 | 87 |
| National | 60 | 62 |
| Sports | 66 | 97 |
| World | 55 | 61 |

500

Single-Category Selection Rule

| Division of the highest score | Division of the second highest score | Pattern | Human examination | Learning |
|---|---|---|---|---|
| High | Low | I | Unnecessary | Unnecessary |
| | Medium | | | |
| | High | | | |
| Medium | Low | II | Unnecessary | Necessary |
| | Medium | III | Necessary | Necessary |
| | High | | | |
| Low | Low | | | |
| | Medium | | | |
| | High | | | |

FIG. 6

| No | Optimum category | Text of document | Highest score | Second highest | Third highest | Fourth highest |
|---|---|---|---|---|---|---|
| 1 | National | A man was arrested Monday after he allegedly stra... | National (62.66) | Sports (27.12) | Business (0.76) | World (0.51) |
| 2 | National | Two men have been arrested on suspicion of kidnap... | National (50.91) | Sports (8.93) | Business (2.56) | World (2.22) |
| 3 | National | The third annual La Folle Journee au Japon classic... | World (23.34) | National (20.26) | Sports (9.22) | Business (8.41) |
| 4 | National | Four people arrested on suspicion of breaking into ... | Business (44.13) | National (38.61) | World (23.11) | Sports (4.86) |
| 5 | National | Fumihiro Joyu, former leader of the Aum Supreme T... | Business (43.72) | National (29.74) | World (13.91) | Sports (8.03) |
| 6 | Sports | Prior to the start of the J.League season, Gamba O... | Sports (66.74) | National (31.74) | World (5.97) | Business (0.66) |
| 7 | Sports | John Kirwan finally gets the chance to see if the J... | National (30.56) | Sports (20.69) | World (7.19) | Business (2.42) |
| 8 | Sports | Ai Miyazato came close to her first title on the U.S.... | Sports (97.89) | National (26.48) | World (1.63) | Business (0.50) |
| 9 | Sports | Ozeki Tochiazuma announced his retirement from th... | Sports (49.04) | National (26.38) | World (6.00) | Business (0.89) |
| 10 | Sports | Veteran southpaw Kazuhisa Ishii held Yomiuri's red-... | Sports (98.42) | National (25.73) | Business (0.49) | World (0.46) |
| 11 | Business | Pentax Corp. President Takashi Watanuki and other ... | Business (96.04) | National (60.73) | World (6.81) | Sports (4.17) |
| 12 | Business | Japan Post, which will be privatized on Oct. 1 into a... | Business (99.55) | National (27.66) | Sports (7.81) | World (4.21) |
| 13 | Business | The battle between Rakuten Inc. and Tokyo Broadc... | Business (44.79) | National (12.58) | Sports (9.24) | World (7.05) |
| 14 | Business | To stimulate competition in the service industry, th... | Business (95.83) | National (32.64) | World (31.70) | Sports (2.11) |
| 15 | Business | Prices for European imports, such as wine and chee... | Business (98.54) | National (16.38) | Sports (8.07) | World (2.67) |
| 16 | World | In 2003, the Japanese government made the strateg... | National (54.33) | World (50.92) | Sports (5.37) | Business (3.17) |
| 17 | World | Prime Minister Shinzo Abe and U.S. President Georg... | World (98.52) | National (10.52) | Business (9.09) | Sports (5.80) |
| 18 | World | U.S. President George W. Bush and his wife, Laura, ... | World (45.52) | National (27.39) | Business (8.51) | Sports (7.79) |
| 19 | World | The Japanese and U.S. governments have agreed to... | World (98.62) | Business (30.84) | National (10.46) | Sports (1.97) |
| 20 | World | When Prime Minister Shinzo Abe arrives in Washing... | World (60.55) | National (43.66) | Sports (8.25) | Business (0.83) |

600 

|  | Highest Score | Second Highest Score | Pattern |
|---|---|---|---|
| 1. | National (High) | Sports (Low) | I |
| 2. | National (Medium) | Sports (Low) | II |
| 3. | World (Low) | National (Low) | III |
| 4. | Business (Low) | National (Low) | III |
| 5. | Business (Low) | National (Low) | III |
| 6. | Sports (Medium) | National (Low) | II |
| 7. | National (Low) | Sports (Low) | III |
| 8. | Sports (High) | National (Low) | I |
| 9. | Sports (Low) | National (Low) | III |
| 10. | Sports (High) | National (Low) | I |
| 11. | Business (High) | National (Medium) | I |
| 12. | Business (High) | National (Low) | I |
| 13. | Business (Low) | National (Low) | III |
| 14. | Business (High) | National (Low) | I |
| 15. | Business (High) | National (Low) | I |
| 16. | National (Low) | World (Low) | III |
| 17. | World (High) | National (Low) | I |
| 18. | World (Low) | National (Low) | III |
| 19. | World (High) | Business (Low) | I |
| 20. | World (Medium) | National (Low) | III |

610 

COMPUTER-BASED METHOD AND SYSTEM FOR EFFICIENT CATEGORIZING OF DIGITAL DOCUMENTS

BACKGROUND OF THE INVENTION

1. Technical Field of the Invention

The present invention relates in general to the field of machine learning, and in particular to computer-based supervised classification of digital documents.

2. Description of the Related Art

In a supervised classification for a single class model, a knowledge base for calculating a relevant score for each category is created by a statistical method, such as the Naïve Bayes method. The statistical method creates the knowledge base by extracting a feature word from training documents that have been categorized in advance by a person. When the automatic categorization is performed, a relevant score of each category for an unclassified document is calculated from the knowledge base and the unclassified document is categorized into a category with the highest score.

With regard to the English language, processing on an uneven description of a normal form, a conjugation form, a singular form and a plural form is generally performed by the Lexical Analysis method, the POS Tagging method, or the Stemming method using a word dictionary. Feature words, such as a proper name, a general name, a verb, etc., are extracted and a relevant score of a category for a document is calculated from some non-functional words.

However, if words are extracted without any processing on the uneven description or any specification of the part of speech, the relevance of the featured words is weakened, making the credibility of the calculated relevant score lower. For example, if a new document includes the word "solutions" when the word "solution" is recognized as an important word in the training document of a category X, the presence of the word "solutions" in the new document is not reflected on the relevant score of the category X. This is because "solutions" and "solution" are not recognized as the same word.

If a knowledge base is created with words extracted by a simple method, the relevant score that is calculated when the automatic categorization is performed becomes vague. That sometimes leads to a case in which a category for a particular document with the second highest score, instead of the category with the highest score, is the optimal category.

BRIEF SUMMARY OF THE INVENTION

The present invention provides a method, system and computer-readable medium for computer-based supervised classification of digital documents that can exclusively identify an optimal category for the single class model by dividing a calculated score of each category into groups (thresholds can be automatically decided from the knowledge base) and can further predict whether the category will be subjected to human examination and whether feedback learning should be performed. In one embodiment, the method comprises calculating a category score for each of a number of categories for which a digital document may be classified. The category score is based on the words in the digital document. The method further comprises determining more than one threshold score for each the categories. The threshold scores define a number of category relevance types. The method further comprises determining the highest category score and the second highest category score for the digital document, applying a single-category selection rule to the first highest category score and the second highest category score to determine a category pattern for the digital document, determining whether human examination is required to select the category for the digital document based upon the category pattern of the digital document; and in response to determining that human examination is not required to select the category for the digital document, automatically selecting the category with the first highest score.

The above, as well as additional purposes, features, and advantages of the present invention will become apparent in the following detailed written description.

BRIEF DESCRIPTION OF THE SEVERAL VIEWS OF THE DRAWINGS

The novel features believed characteristic of the invention are set forth in the appended claims. The invention itself, however, as well as a best mode of use, further purposes and advantages thereof, will best be understood by reference to the following detailed description of an illustrative embodiment when read in conjunction with the accompanying drawings, where:

FIG. 6 shows two tables that depict exemplary category scores and category selections for twenty documents processed in accordance with one or more embodiments of the present invention.

DETAILED DESCRIPTION OF THE INVENTION

An illustrative embodiment of the present invention is directed to a method, system and computer-readable medium for computer-based supervised classification of digital documents that can exclusively identify an optimal category for the single class model by dividing a calculated score of each category into groups (thresholds can be automatically decided from the knowledge base) and can further predict whether it will be subjected to human examination and whether feedback learning should be performed. The present invention can take the form of an entirely hardware embodiment, an entirely software embodiment or an embodiment containing both hardware and software elements. In an illustrative embodiment, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus or device.

The medium can be an electronic, magnetic, optical, electromagnetic, infrared or semiconductor system, apparatus or device or a propagation medium. Examples of a computer-readable medium include a semiconductor or solid state memory (e.g., flash drive memory), magnetic tape, a removable computer diskette, a random access memory (RAM), a read-only memory (ROM), a rigid magnetic disk (e.g., a hard drive) and an optical disk. Current examples of optical disks include compact disk-read only memory (CD-ROM), compact disk-read/write (CD-R/W) and Digital Versatile Disk (DVD).

Figure 1:
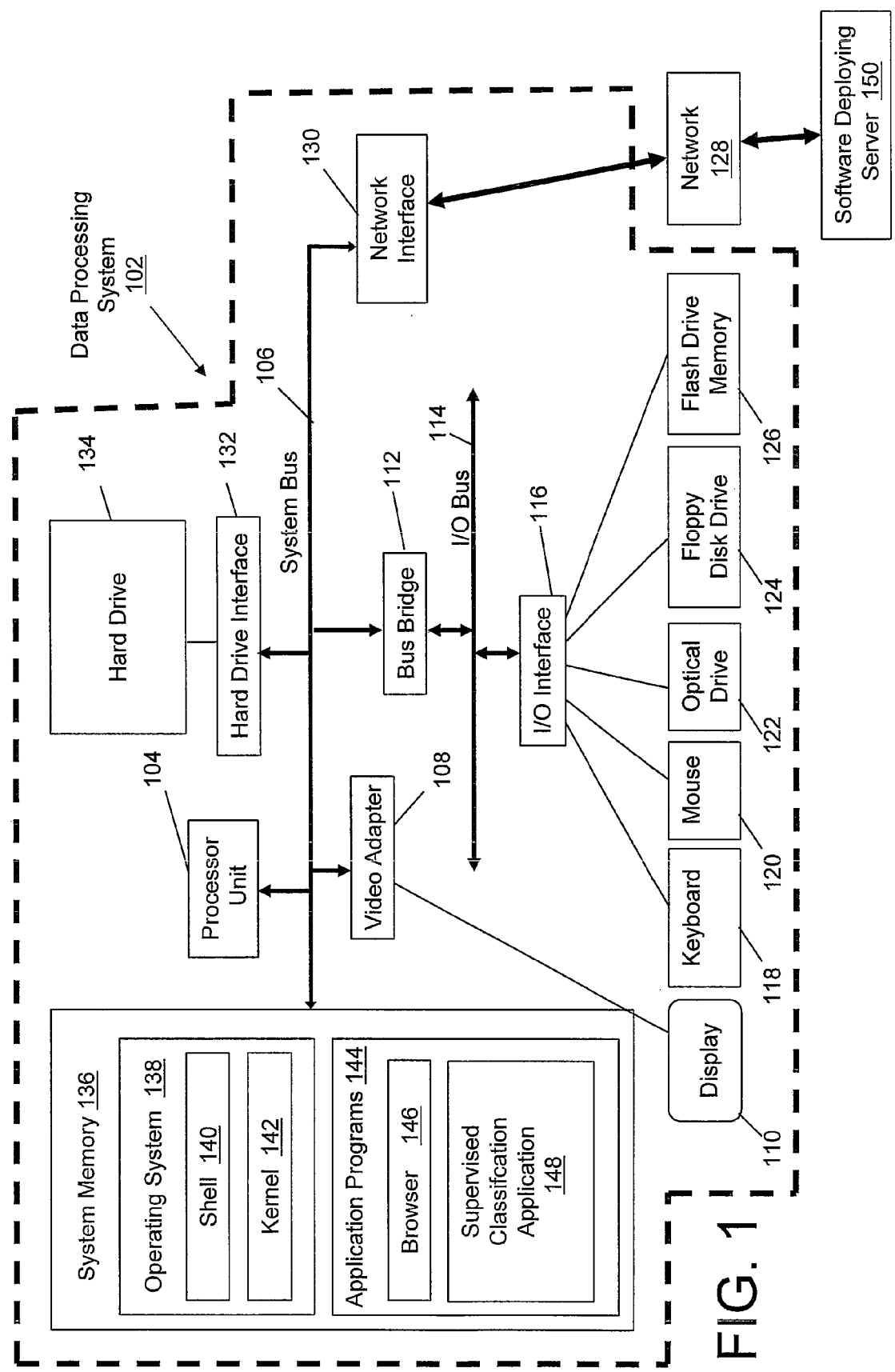
FIG. 1 shows a block diagram of an exemplary data processing system in which the present invention may be implemented.

Referring now to the drawings, wherein like numbers denote like parts throughout the several views, FIG. 1 shows a block diagram of a data processing system suitable for storing and/or executing program code in accordance with one or more embodiments of the present invention. The hardware elements depicted in data processing system 102 are not intended to be exhaustive, but rather are representative of one embodiment of the present invention. Data processing system 102 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, an optical disk drive 122, a floppy disk drive 124, and a flash drive memory 126. The format of the ports connected to I/O interface 116 may be any known to those skilled in the art of computer architecture, including but not limited to Universal Serial Bus (USB) ports.

Data processing system 102 is able to communicate with a software deploying server 150 via a network 128 using a network interface 130, which is coupled to system bus 106. Network 128 may be an external network such as the Internet, or an internal network such as an Ethernet or a Virtual Private Network (VPN). Software deploying server 150 may utilize a similar architecture design as that described for data processing system 102.

A hard drive interface 132 is also coupled to system bus 106. Hard drive interface 132 interfaces with hard drive 134. In an illustrative embodiment, hard drive 134 populates a system memory 136, which is also coupled to system bus 106. Data that populates system memory 136 includes an operating system (OS) 138 of data processing system 102 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a browser 146. Browser 146 includes program modules and instructions enabling a World Wide Web (WWW) client (i.e., data processing system 102) to send and receive network messages to the Internet using HyperText Transfer Protocol (HTTP) messaging, thus enabling communication with software deploying server 150.

Application programs 144 in the system memory of data processing system 102 (as well as the system memory of software deploying server 150) also include supervised classification application 148. Supervised classification application 148 comprises computer-executable code, at least a portion of which implements the method described herein. Supervised classification application 148 may reside in system memory 136, as shown, and/or may be stored in non-volatile bulk storage such as hard drive 134. In one embodiment, data processing system 102 is able to download supervised classification application 148 from software deploying server 150.

The hardware elements depicted in data processing system 102 are not intended to be exhaustive, but rather are representative to highlight essential components required by the present invention. For instance, data processing system 102 may include alternate memory storage devices such as magnetic cassettes, Digital Versatile Disks (DVDs), Bernoulli cartridges, and the like. These and other variations are intended to be within the spirit and scope of the present invention.

Note further that, in one embodiment of the present invention, software deploying server 150 performs all of the functions associated with the present invention (including execution of supervised classification application 148), thus freeing data processing system 102 from having to use its own internal computing resources to execute supervised classification application 148.

Figure 2:
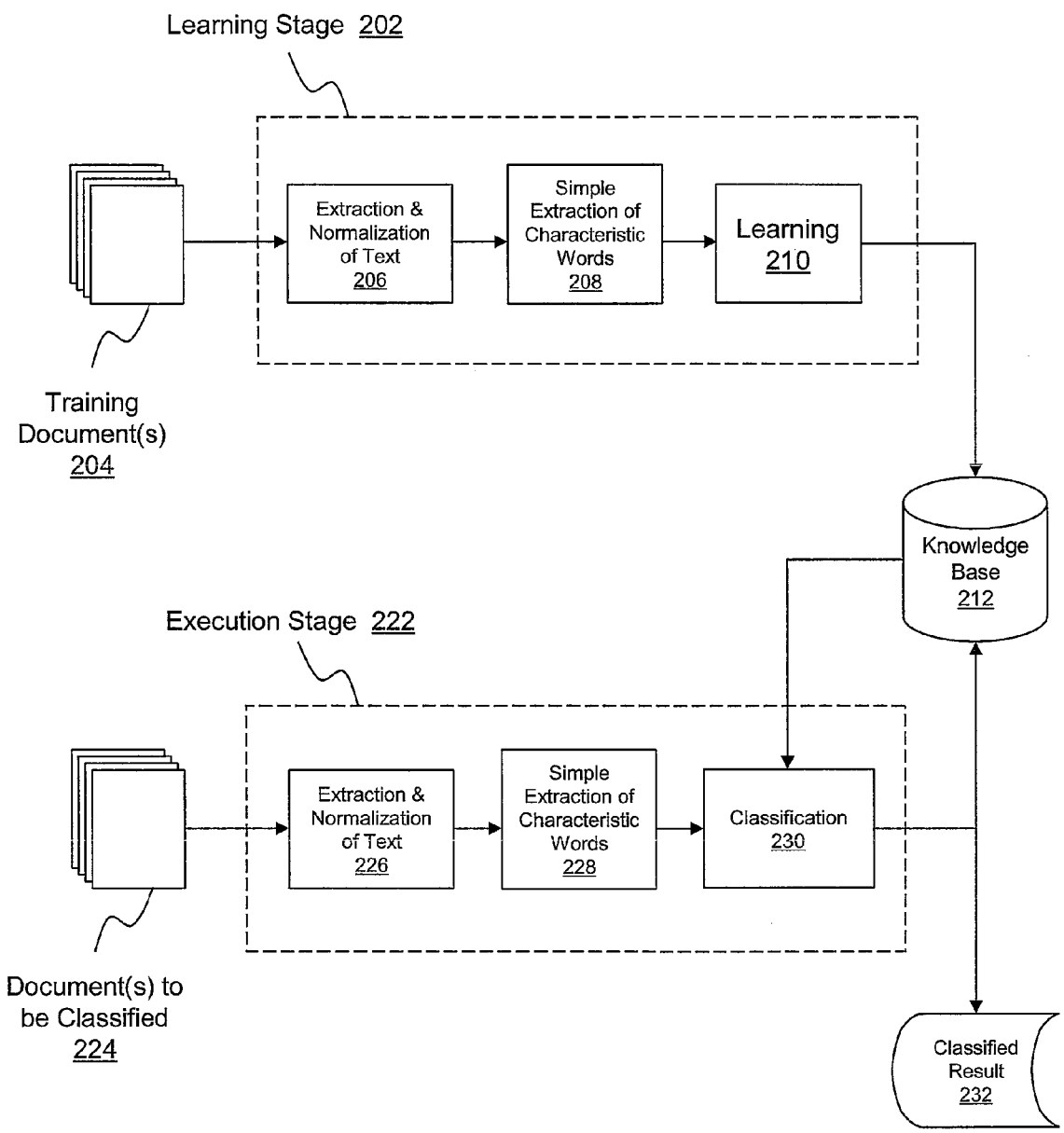
FIG. 2 is a block diagram depicting a method 200 for supervised classification of digital documents using simple word extraction methods in accordance with one or more embodiments of the present invention.

With reference now to FIG. 2, a block diagram is shown depicting a method 200 for supervised classification of digital documents in accordance with one or more embodiments of the present invention. System 200 is comprised of two stages: learning stage 202 and execution stage 222. In learning stage 202, training documents 204 are used to compile knowledge base 212. Text is extracted from training documents 204 and normalized into a format understood by learning stage 202 (step 206). From the text extracted in step 206, feature words are extracted in step 208. For example, with English language documents, simple extracting methods with light processing as described below are performed, instead of extracting proper nouns, nouns, verbs and non-functional words which are defined by the Lexical Analysis and the POS Tagging method and that use a word dictionary with attributes like a singular form and a plural form.

Simple extracting methods include:
(1) extracting words separated by a space;
(2) extracting words separated by a space and further excluding any string consisting of three letters or less (most articles, prepositions, pronouns and the like consist of three letters or less); and
(3) extracting words separated by space and further excluding "stop-words" including functional words.

The method of (1) is a quite simple logic. However, since the method extracts all words, the importance of a word needs to be considered using the weighting function like Term Frequency-Inverse Document Frequency (TF-IDF).

The method of (2) is also a simple logic. Since the words consisting of three letters or less are mostly articles, prepositions or pronouns, less important words can be easily excluded. However, important words consisting of three letters or less are also removed.

The method of (3) is also a simple logic. The stop-word needs to be created, but the accuracy of extraction depends on how many unnecessary words can be registered in the stop-word list.

In the stop-word list, articles (a, an, the), prepositions (on, at, in, before, after, etc.), pronouns (I, my, me, mine, you, she, he, they, that, this, it, etc.), relative adverbs, relative pronounces (which, when, whose, whom, what, where), auxiliary verbs (can, could, may, must, might, will, would, shall, should, ought, used, dare, dared, need, have, having, do, does, etc), be-verb (am, is, are, were, been, being, etc.), conjunctions (and, but, or, however, whether, because, though, although, etc.), numerals (one, two, three, four, five, first, second, third, fourth, fifth, etc.), adverbs (more, than, only, since, soon, ever, little, large, about, such, over, still, both, also, well, full, upper, between, apparently, early, etc.) and the like are registered.

For example, from the text, "Describe how your invention works, and how it could be implemented, using text, diagrams and flow charts as appropriate," only the following important words can be extracted by the above-mentioned method of (3): "describe", "invention", "works", "implemented", "using", "text", "diagrams", "flow", "charts", "appropriate".

The categories of training documents 204 are known, and in step 210 learning stage 202 uses this information to learn which extracted feature words are characteristic of a category. The associations made during step 210 are stored in knowledge base 212 for use in execution stage 222. The knowledge base is created in a simple word extracting method (e.g., separating by spaces) from training documents 204.

In execution stage 222, one or more digital documents 224 are classified based upon characteristic words in each document. The text from document 224 is extracted and normalized into a format understood by execution stage 222 (step 226). From the text extracted in step 226, characteristic words are identified in step 228. Identification of the characteristic words is aided by dictionary/thesaurus 214. The characteristic words identified in step 228, along with information learned in the learning stage 202 and stored in knowledge base 212, are used to calculate scores for a number of potential categories to which document 224 may be classified. Based upon the scores of the categories, document 224 is classified into a category in step 230 and the result is stored as classified result 232. Depending upon a pattern associated with the document (disclosed in further detail below), the result may also be provided to knowledge base 212 for learning purposes via feedback 234.

If accuracy of the scores is not so good, a category with the second highest score may be more optimal than a category with the highest score. For such circumstances, a method for exclusively selecting an optimal category will be described below.

Figure 3:
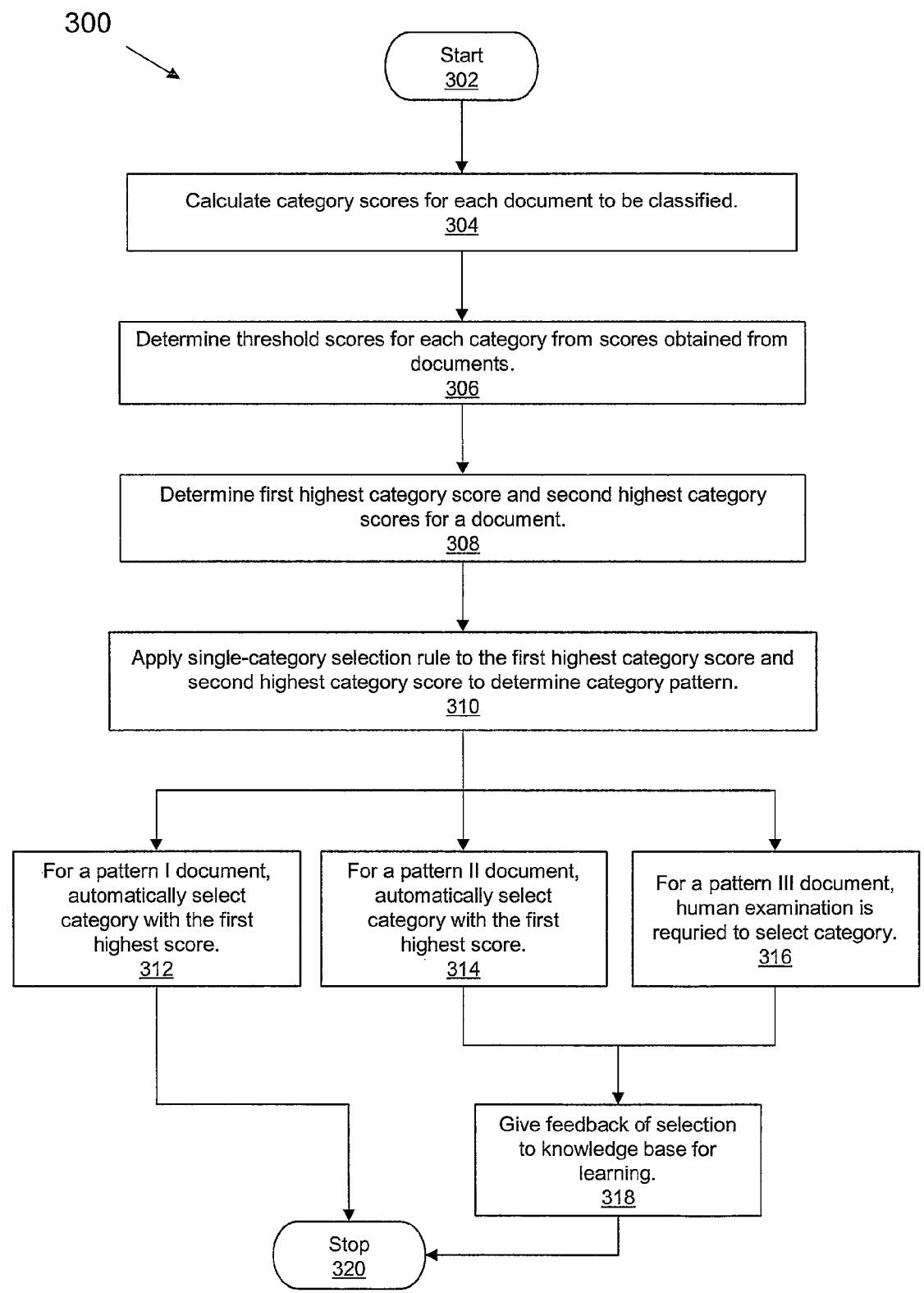
FIG. 3 is a flowchart depicting a more efficient and less computationally intensive method for performing the classifying step 230 of FIG. 2 in accordance with one or more embodiments of the present invention.

With reference now to FIG. 3, a flowchart is shown depicting an improved method for performing the classifying step 230 of FIG. 2. Process 300 starts at initiator block 302 and proceeds to step 304, where category scores are calculated for each document 224 that is to be classified. The score distribution of training documents 204 approximates the score distribution of documents 224. Since the distribution of scores differs for each category, threshold scores are determined for each category (step 306) from the scores obtained from training documents 204. The threshold scores subdivide the scores in each category into several candidate relevance types. If proportions of the numbers of documents for a given category are decided in advance (for example, 50% for high, 25% for medium and 25% for low), threshold scores are determined for each category as shown in table 400 of FIG. 4.

Figure 4:
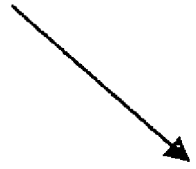
FIG. 4 is a table 400 indicating exemplary two threshold values for determining category relevance types in accordance with one or more embodiments of the present invention.

With reference now to FIG. 4, a table 400 indicating the threshold values of four exemplary categories is shown. Documents 224 are classified into one of four categories (e.g., Business, National, Sport and World) based upon the text of the documents and the category scores generated from the text. A category score exceeding threshold 2 is in the "high" range, indicating that the category is likely to have a high relevance to the document. A category score between threshold 1 and threshold 2 is in the "medium" range, indicating that the category is likely to have a medium relevance to the document. A category score less than threshold 1 is in the "low" range, indicating that the category is likely to have a low relevance to the document.

Returning now to FIG. 3, after the threshold scores are determined in step 306, categories are evaluated for each document 224 based upon the category scores of each category. The two highest scores are selected as candidate categories and assigned a candidate relevance type (step 308). A single-category selection rule, based upon the candidate relevance types of the candidate categories, is applied to the candidate categories to automatically determine the category pattern of the document (step 310). An example of such a single-category selection rule is shown in table 500 of FIG. 5. For a pattern I document, the category with the highest score is automatically selected (step 312) and the process ends (step 320). For a pattern II document, the category with the highest score is automatically selected (step 314) and the category assignment is fed back to knowledge base 212 for learning purposes (step 318). The process ends at terminator 320 and no human examination is required to determine whether the category assignment is appropriate. For a pattern III document, human examination is required to determine whether the category with the highest score or the category with the second highest score is most relevant to the document (step 316). The category assignment is fed back to knowledge base 212 for learning purposes (step 318) and the process ends at terminator 320. Category pattern determination is discussed further in reference to FIG. 5.

Figure 5:
FIG. 5 is a table 500 depicting an exemplary single-category selection rule in accordance with one or more embodiments of the present invention.

With reference now to FIG. 5, table 500 is shown depicting an exemplary single-category selection rule. Based on the distribution of the category scores calculated in step 304, a rule for selecting a single-category as shown in table 500 is created. Table 500 indicates possible combinations of candidate categories for a particular document according to candidate relevance type. The category with the highest score and the category with the second highest score are relatively compared to estimate the credibility of the highest category. For that purpose, the candidate with highest score and the candidate with the second highest score are assigned a candidate relevance type based upon their scores.

The selection rule in FIG. 5 gives rise to three category patterns for a document based upon whether feedback learning should be performed and whether human examination is needed to selected the category for the document. As shown in the table 500, the patterns I and II of the combinations of (high+high/medium/low) and (medium+low) predict that the credibility of the highest category is high. On the other hand, since the candidate with the highest score in pattern III has low credibility, it needs human examination. Since the credibility decreases in the order of high, medium and low, by giving feedback for a document with a medium score or a low score of an optimal category to be learned, a similar document will have a higher score next time.

In the case of pattern I, the candidate category with the highest score is selected. Human examination and feedback learning is not necessary to assign the category to the document. In the case of pattern II, the candidate category with the highest score is selected. Feedback is then given to knowledge base 212 for learning purposes. In the case of pattern III, human examination is necessary. A person examines whether or not to select the candidate category with the highest score or the candidate category with the second highest score. This selection is fed back into knowledge base 212 to improve accuracy.

With reference now to FIG. 6, two tables are shown that depict exemplary category scores and category selections for twenty documents processed in accordance with one or more embodiments of the present invention. Table 600 shows a list a documents for which category score have been calculated. The category scores are shown in descending order from left to shows a list of documents for which categories have been assigned in accordance with one or more embodiments of the present invention, which enables a more accurate assignment of single-categories than is indicated by the "optimum category" column of table 600.

For example, the following category scores have been calculated for document 1 of table 600: National (62.66), Sports (21.12), Business (0.76) and World (0.51). The highest category score is "National". "National" has category relevance type "high", because (referring back to table 400 of FIG. 4) the score of 62.66 exceeds threshold 2 (62) for the "National" distribution of categories. The second highest category score is "Sports". "Sports" has category relevance type "low", because the score of 27.12 is less than threshold 1 (66) for the "Sports" distribution of categories. Document 1 is therefore a pattern I document, having a "high" category relevance type (National) and a "low" category relevance type (Sports). Document 1 is automatically classified as a "National" document without any human examination.

In another example, the following category scores have been calculated for document 6 of table 600: Sports (66.74), National (31.74), World (5.97) and Business (0.66). The highest category score is "Sports". "Sports" has category relevance type "medium", because the score of 66.74 lies between threshold 1 (66) and threshold 2 (97) for the "Sports" distribution of categories. The second highest category score is "National". "National" is a category of type "low", because the score of 31.74 lies below threshold 1 (60) for the "National" distribution of categories. Document 6 is therefore a pattern II document, having a "medium" category relevance type (Sports) and a "low" category relevance type (National) and no other candidate categories. Document 6 is automatically classified as a "Sports" document and feedback will be given to knowledge base 212 for learning.

In another example, the following category scores have been calculated for document 3 of table 600: World (23.34), National (20.26), Sports (9.22) and Business (8.41). The highest category score is "World". "World" has category relevance type "low", because the score of 23.34 lies below threshold 1 (55) for the "World" distribution of categories. The second highest category score is "National". "National" is a category of type "low", because the score of 20.26 lies below threshold 1 (60) for the "National" distribution of categories. Document 3 is therefore a pattern III document, having two "low" category relevance types (World and National). Document 3 requires human examination to determine whether document 3 should be classified as "World" or "National", and feedback will be given to knowledge base 212 for learning.

Utilizing the method above, an optimum category for each document can be efficiently selected and a document whose feedback is to be given can be identified. Sixty percent of documents (those having of patterns I and patterns II) do not need any human examination (i.e., all documents were correct). Forty percent of the documents (those having pattern III) are selected for human examination so that they can be selected for appropriate categories. Feedback for the documents of the patterns II and III are given to the knowledge base for learning. By reducing the number of documents that require human examination, this method is more efficient at performing supervised classification.

While the present invention has been particularly shown and described with reference to an illustrative embodiment, it will be understood by those skilled in the art that various changes in form and detail may be made therein without departing from the spirit and scope of the invention. Furthermore, as used in the specification and the appended claims, the term "computer" or "computer system" or "computing device" includes any data processing system including, but not limited to, personal computers, servers, workstations, network computers, mainframe computers, routers, switches, Personal Digital Assistants (PDA's), telephones, and any other system capable of processing, transmitting, receiving, capturing and/or storing data. The term "system" or "information system" includes a network of data processing systems.

Flowcharts and diagrams in the Figures illustrate the architecture, functionality, and operation of possible implementations of systems, methods and computer program products according to various embodiments of the present invention. In this regard, each block in the flowchart or diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to illustrative embodiments thereof, it will be apparent that modifications and variations are possible without departing from the scope of the invention defined in the appended claims.

What is claimed is:

1. A computer-based method for supervised classification of digital documents comprising:
    automatically calculating, within a computer, a category score for each of a plurality of categories for which a digital document may be classified, wherein the category score is based on a plurality of words in the digital document;
    determining a plurality of threshold scores for each of said plurality of categories, wherein the threshold scores define a plurality of category relevance types;
    automatically determining a first highest category score and a second highest category score for the digital document;
    applying a single-category selection rule to the first highest category score and the second highest category score to determine a category pattern for the digital document;
    automatically determining whether human examination is required to select the category for the digital document based upon the category pattern of the digital document; 
    in response to determining that human examination is not required to select the category for the digital document, automatically selecting the category with the first highest score; and
    in response to determining that human examination is required to select the category for the digital document, selecting either the category with the first highest score or second highest score based on human examination.

2. The method of claim 1, wherein said calculating includes a simple extracting method.

3. The method of claim 1, wherein the category selected for the digital document is fed back to a knowledge base for machine-learning purposes.

4. The method of claim 1, further comprising:
    a first category pattern, wherein the category with the first highest category score is automatically selected for a digital document having the first category pattern;
    a second category pattern, wherein the category with the first highest category score is automatically selected for a digital document having the second category pattern and the selected category is fed back to a knowledge base for machine-learning purposes; and
    a third category pattern, wherein a human selects either the category with the first highest category score or the category with the second highest category score for a digital document having the thirds category pattern and the selected category is fed back to a knowledge base for machine-learning purposes.

5. A system for computer-based supervised classification of digital documents comprising:
    means for automatically calculating, within a computer, a category score for each of a plurality of categories for which a digital document may be classified, wherein the category score is based on a plurality of words in the digital document;
    means for determining a plurality of threshold scores for each of said plurality of categories, wherein the threshold scores define a plurality of category relevance types;
    means for automatically determining a first highest category score and a second highest category score for the digital document;
    means for applying a single-category selection rule to the first highest category score and the second highest category score to determine a category pattern for the digital document;
    means for automatically determining whether human examination is required to select the category for the digital document based upon the category pattern of the digital document;
    means, responsive to determining that human examination is not required to select the category for the digital document, for automatically selecting the category with the first highest score; and
    means, responsive to determining that human examination is required to select the category for the digital document, for selecting either the category with the first highest score or second highest score based on human examination.

6. The method of claim 5, wherein said means for calculating includes a means for simple extraction of words from the digital document.

7. The system of claim 5, wherein the category selected for the digital document is fed back to a knowledge base for machine-learning purposes.

8. The system of claim 5, further comprising:
    a first category pattern, wherein the category with the first highest category score is automatically selected for a digital document having the first category pattern;
    a second category pattern, wherein the category with the first highest category score is automatically selected for a digital document having the second category pattern and the selected category is fed back to a knowledge base for machine-learning purposes; and
    a third category pattern, wherein a human selects either the category with the first highest category score or the category with the second highest category score for a digital document having the thirds category pattern and the selected category is fed back to a knowledge base for machine-learning purposes.

9. A computer-readable medium encoded with a computer program that, when executed, causes the control circuitry of a data processing system to perform steps for supervised classification of digital documents comprising:
    automatically calculating, within a computer, a category score for each of a plurality of categories for which a digital document may be classified, wherein the category score is based on a plurality of words in the digital document;
    determining a plurality of threshold scores for each of said plurality of categories, wherein the threshold scores define a plurality of category relevance types;
    automatically determining a first highest category score and a second highest category score for the digital document;
    applying a single-category selection rule to the first highest category score and the second highest category score to determine a category pattern for the digital document;

automatically determining whether human examination is required to select the category for the digital document based upon the category pattern of the digital document;

in response to determining that human examination is not required to select the category for the digital document, automatically selecting the category with the first highest score; and in response to determining that human examination is required to select the category for the digital document, selecting either the category with the first highest score or second highest score based on human examination.

10. The method of claim 9, wherein said calculating includes a simple extracting method.

11. The computer-readable medium of claim 9, wherein the category selected for the digital document is fed back to a knowledge base for machine-learning purposes.

12. The computer-readable medium of claim 9, further comprising:

a first category pattern, wherein the category with the first highest category score is automatically selected for a digital document having the first category pattern;

a second category pattern, wherein the category with the first highest category score is automatically selected for a digital document having the second category pattern and the selected category is fed back to a knowledge base for machine-learning purposes; and a third category pattern, wherein a human selects either the category with the first highest category score or the category with the second highest category score for a digital document having the thirds category pattern and the selected category is fed back to a knowledge base for machine-learning purposes.

* * * * *